Feb. 27, 1934.    J. CARDOT    1,949,037
APPARATUS FOR THE DRAWING OF TUBULAR BODIES OF GLASS AND THE LIKE
Filed May 18, 1931
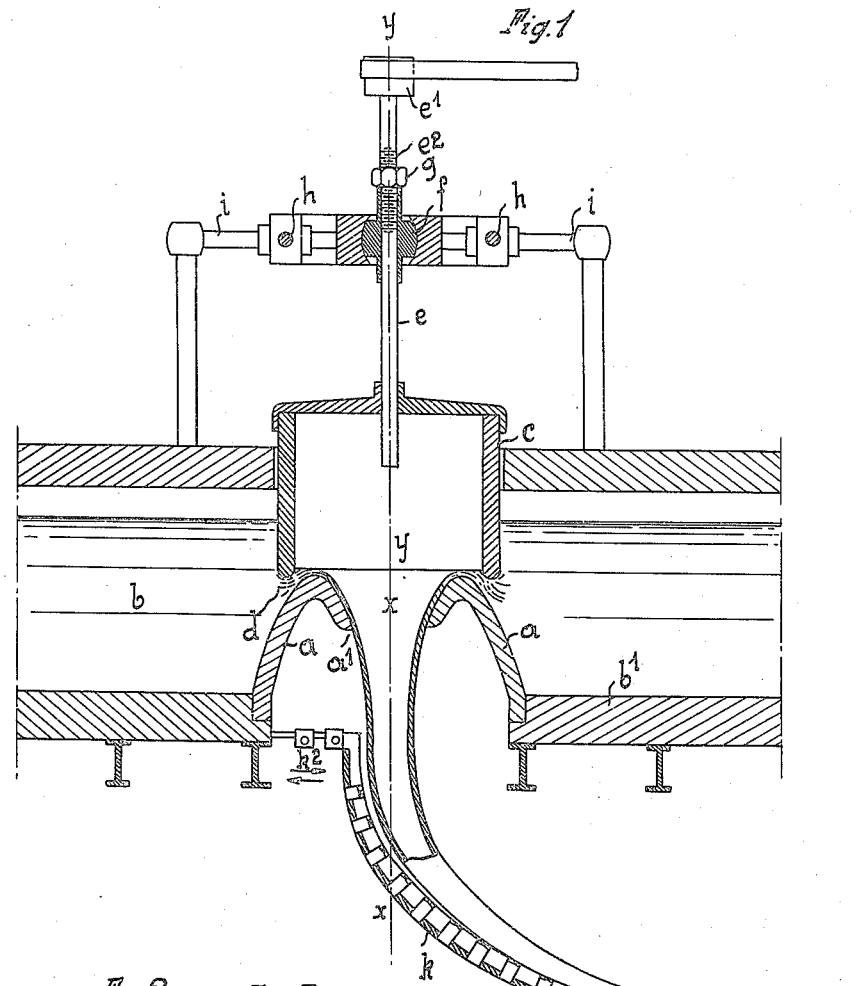
Fig. 1
 Fig. 2    Fig. 3
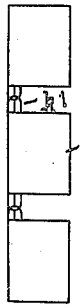 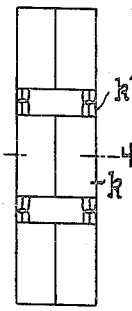

INVENTOR
Jean Cardot
by Howson and Howson
Attys.

Patented Feb. 27, 1934

1,949,037

UNITED STATES PATENT OFFICE 1,949,037

APPARATUS FOR THE DRAWING OF TUBULAR BODIES OF GLASS AND THE LIKE

Jean Cardot, Bagneaux sur Loing, France, assignor, by mesne assignments, to Corning Glass Works, Corning, N. Y., a corporation of New York Application May 18, 1931, Serial No. 538,355
In France May 21, 1930

8 Claims. (Cl. 49—17.1)

The present invention relates to an arrangement for the drawing of hollow bodies in the shape of a tube or sleeve, of plastic material, more particularly of glass.

This arrangement is characterized by the fact that the plastic material flows out by gravity through a member having a surface of revolution in the shape of a funnel, mounted in the sole of the drawing tank and completely submerged in the bath of fused or molten material, and by the fact that the delivery of this material is effected by a rotary organ in the shape of a bell which plunges into the bath of glass and caps or crowns the funnel and is adjustable as to position and inclination in every direction, this bell-shaped organ serving also to arrest impurities on the surface of the bath of material.

The annexed drawing represents, by way of example, one form of constructing the arrangement according to the invention in its application to the horizontal drawing of tubular bodies of glass.

Figure 1 is a view in axial vertical section of the arrangement, the parts being in exterior view.

Figures 2 and 3 are views in side elevation and in plan of a detail.

Figure 4:
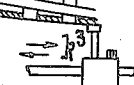
Figure 4 is a section on line 4—4 of Figure 3.

The bath of molten glass contained in the drawing tank flows by gravity through a member in the shape of a funnel $a$ fixed or set in the sole or base $b^1$ of the tank $b$; this member, which is shaped to a surface of revolution around the vertical axis $x\ x$, ends at its upper part in an aperture $a^1$ of which the cross section is contracted towards the base and through which the glass to be drawn will pass. This member $a$ may be of refractory material, of metal non-oxidizable by heat, or partly of refractory material and partly of metal. The upper part of this member $a$ is at a slight distance below the level of the bath of glass in the tank. An organ $c$, having the shape of a bell and supported at its upper part, plunges in the bath of glass and caps or crowns the member $a$, being held at a slight distance from the upper part of the latter, in such a manner as to determine, in combination with the latter, an annular gap $d$ for the flow of glass intended to pass through the aperture $a^1$ in the funnel-shaped member $a$. This bell-shaped organ $c$ is subjected to a movement of rotation around its axis $y\ y$ by means of a pulley $e^1$ fixed upon the shaft $e$ carrying the bell $c$, externally of the drawing tank. This shaft $e$ is hollow so that compressed air can be caused to arrive therethrough into the interior of the bell, this compressed air being intended to facilitate in the known manner the drawing of the hollow bodies. The bell-shaped organ $c$ is supported by the intermediary of an arrangement, which allows to be given to the bell a position and an inclination adjustable in every direction. The inclination of the axis $y\ y$ of the bell $c$ relatively to the axis $x\ x$ of the member $a$ can be modified by reason of the knee-piece $f$. The bell $c$ can be brought closer to or be separated from the organ $a$ by screwing or unscrewing a nut $g$ along a screw-threaded part $e^2$ of the shaft $e$, which nut acts on the ball of the knee-piece $f$. The horizontal movement of the bell-shaped member $c$ is obtained by causing the knee-piece $f$ to slide on two parallel and horizontal bars $h\ h$, which at their extremities can slide on two other parallel and horizontal bars $i\ i$, perpendicular to the first two and connected to the framework of the machine.

The drawn glass is bent through a right angle and drawn horizontally. For this purpose, at its exit from the organ $a$, it is supported by a flexible gutter $k$ formed by V-shaped elements, (figure 4) connected together by joints at $k^1$ (figures 2 and 3) and forming a chain. The two extremities of this chain can be displaced, parallel to the horizontal drawing axis, at $k^2\ k^3$, in such a manner as to support or relieve more or less the dependent mass of glass along the curve which is given to it.

The thickness of the tubes obtained by the drawing operation is determined by the position of the bell $c$ relatively to the organ $a$, by the speed of drawing, and by the pressure of the air admitted through the hollow shaft $e$ supporting the bell member.

The adjustable position and inclination of the bell $c$ relatively to the organ $a$, enable the delivery of glass to be regulated, enable this delivery to be varied from one point to another in the section of drawing, and thus to regulate the thinning of the tube at the extrados.

The bell $c$ serves also to stop the surface impurities in the bath of glass and to homogenize the glass by its movement of rotation.

What I claim is:

1. An apparatus for the drawing of tubular bodies, of glass or any other plastic material, comprising a drawing tank containing the molten glass, a gate member mounted in the bottom of said tank and completely submerged in the bath of glass, and a bell shaped member partially immerged in the bath of glass, above and around the said gate member the pressure within the bell remaining constant.

2. An apparatus for the drawing of tubular bodies, of glass or any other plastic material, comprising a drawing tank containing the molten glass, a funnel shaped gate member mounted in the bottom of said tank and completely submerged in the bath of glass, and a bell shaped member partially immerged in the bath of glass, above and around the said gate member the pressure within the bell remaining constant.

3. An apparatus for the drawing of tubular bodies, of glass or any other plastic material, comprising a drawing tank containing the molten glass, a gate member mounted in the bottom of said tank and completely submerged in the bath of glass, and a bell shaped member partially immerged in the bath of glass, above and around the said gate member the pressure within the bell remaining constant, together with means for adjusting said bell shaped member as to position in height relatively to the funnel.

4. An apparatus for drawing of tubular bodies, of glass or any other plastic material, comprising a drawing tank containing the molten glass, a gate member mounted in the bottom of said tank and completely submerged in the bath of glass, and a bell shaped member partially immerged in the bath of glass, above and around the said gate member the pressure within the bell remaining constant, together with means for laterally adjusting said bell shaped member relatively to the funnel.

5. An apparatus for the drawing of tubular bodies, of glass or any other plastic material, comprising a drawing tank containing the molten glass, a gate member mounted in the bottom of said tank and completely submerged in the bath of glass, and a bell shaped member partially immerged in the bath of glass, above and around the said gate member, together with means for angularly adjusting the bell shaped member in every direction.

6. An apparatus for the drawing of tubular bodies, of glass or any other plastic material, comprising a drawing tank containing the molten glass, a gate member mounted in the bottom of said tank and completely submerged in the bath of glass, and a bell shaped member partially immerged in the bath of glass, above and around the said gate member, together with means for imparting a movement of rotation to said bell shaped member around its axis.

7. An apparatus for the drawing of tubular bodies, of glass or any other plastic material, comprising a drawing tank containing the molten glass, a gate member mounted in the bottom of said tank and completely submerged in the bath of glass, and a bell shaped member partially immerged in the bath of glass, above and around the said gate member, together with means for supplying compressed air into said bell shaped member the pressure within the bell remaining constant.

8. An apparatus for the drawing of tubular bodies, of glass or any other plastic material, comprising a drawing tank containing the molten glass, a gate member mounted in the bottom of said tank and completely submerged in the bath of glass, and a bell shaped member partially immerged in the bath of glass, above the said gate member, together with a gutter, adapted to support the drawn article at its exit from the funnel shaped member, said gutter being formed of V shaped jointed elements, and means for giving a variable curve to said gutter.

JEAN CARDOT.